US012774945B2

(12) United States Patent
Li et al.

(10) Patent No.: US 12,774,945 B2
(45) Date of Patent: Oct. 27, 2026

(54) METHOD FOR VERIFYING FAULT-SAND BODY MATCHING BY SELECTIVE CRUDE OIL CHARGING BASED ON PARALLEL DISPLACEMENT SIMULATION

(71) Applicants: Northeast Petroleum University, Daqing City (CN); Daqing Shenqin Energy Technology Co., Ltd., Daqing City (CN)

(72) Inventors: Xin Li, Daqing City (CN); Xiaofei Fu, Daqing City (CN); Jinyou Zhang, Daqing City (CN); Xiaobo Liu, Daqing City (CN); Lingdong Meng, Daqing City (CN); Kun Yan, Daqing City (CN); Tong Zhang, Daqing City (CN); Ruishan Du, Daqing City (CN)

(73) Assignees: Northeast Petroleum University, Daqing City (CN); Daqing Shenqin Energy Technology Co., Ltd., Daqing City (CN)

( * ) Notice: Subject to any disclaimer, the term of this patent is extended or adjusted under 35 U.S.C. 154(b) by 273 days.

(21) Appl. No.: 18/826,557

(22) Filed: Sep. 6, 2024

(65) Prior Publication Data

US 2025/0290841 A1 Sep. 18, 2025

(30) Foreign Application Priority Data

Mar. 18, 2024 (CN) ......................... 202410310413.3

(51) Int. Cl.
*G01N 15/08* (2006.01)
*G01V 20/00* (2024.01)

(52) U.S. Cl.
CPC ........... *G01N 15/082* (2013.01); *G01V 20/00* (2024.01)

(58) Field of Classification Search
CPC ............................. G01N 15/082; G01V 20/00
See application file for complete search history.

(56) References Cited

U.S. PATENT DOCUMENTS

2019/0026405 A1* 1/2019 Ramsay .................. E21B 49/00

FOREIGN PATENT DOCUMENTS

CN 104155157 A * 11/2014
CN 117664820 A * 3/2024 ............. G01N 33/24

(Continued)

*Primary Examiner* — Natalie Huls
(74) *Attorney, Agent, or Firm* — ARC IP Law, PC; Joseph J. Mayo

(57) ABSTRACT

Provided is a method for verifying fault-sand body matching by selective crude oil charging based on parallel displacement simulation. The method includes: selecting a plurality of groups of natural oil-bearing core samples having different porosities and making core columns; testing a charging power and a throat radius corresponding to a first core column, and calculating a vertical oil column height produced by simulated lateral abutting with a fault; mounting the second core column in a clamping simulation system; conducting a crude oil charging saturated formation water core simulation experiment, and simulating a variety of superimposition relationships of sand bodies spatially laterally abutting against the fault; regulating different charging pressures, simulating a vertical oil column height produced by lateral abutting with the fault, and analyzing a fault-sand body power configuration relationship under the action of a buoyancy based on a difference between crude oil charging behaviors in different simulated situations.

8 Claims, 9 Drawing Sheets

(56) References Cited

FOREIGN PATENT DOCUMENTS

| | | | | | |
|---|---|---|---|---|---|
| CN | 118008211 A | * | 5/2024 | ............. | E21B 43/16 |
| CN | 120102394 A | * | 6/2025 | ............. | G01N 15/08 |

* cited by examiner

METHOD FOR VERIFYING FAULT-SAND BODY MATCHING BY SELECTIVE CRUDE OIL CHARGING BASED ON PARALLEL DISPLACEMENT SIMULATION

CROSS REFERENCE TO RELATED APPLICATION

This patent application claims the benefit and priority of Chinese Patent Application No. 202410310413.3, filed with the China National Intellectual Property Administration on Mar. 18, 2024, the disclosure of which is incorporated by reference herein in its entirety as part of the present application.

BACKGROUND OF THE INVENTION

Technical Field of the Invention

The present disclosure relates to the technical field of oil and gas exploration, and in particular to a method for verifying fault-sand body matching by selective crude oil charging based on parallel displacement simulation.

Description of the Related Art

Oil and gas exploration practices have showed that in an oil-gas bearing basin, a fault and sand body configuration is an important transport channel for lower-generating and upper-reservoiring type oil-gas migration and controls oil-gas distributions to a certain extent. However, drilling results revealed that oil-gas distributions are not present at all fault-sand body configurations. In addition to being affected by whether a trap develops, an oil-gas distribution depends to a large extent on whether a fault-sand body configuration can transport oil and gas.

Regarding the role of a fault-sand body configuration in transporting oil and gas, predecessors have made a lot of studies, which are mainly studies on spatial effectiveness of a fault-sand body configuration transporting oil and gas. These studies specifically include: studying conditions required by a fault-sand body configuration to transport oil and gas according to a fault and sand body occurrence configuration relationship; studying a form of the fault-sand body configuration transporting oil and gas according to a fault and sand body spatial configuration pattern; and studying a contribution of the fault-sand body configuration transporting oil and gas to oil-gas reservoir-forming according to a relationship between a characteristic of the fault-sand body configuration transporting oil and gas and an oil-gas distribution. These research results have played an important role in correctly understanding a lower-generating and upper-reservoiring type oil-gas distribution law of an oil-gas bearing basin and guiding oil and gas exploration.

Whether a fault-sand body configuration can transport oil and gas is affected by the dynamic connectivity of the fault-sand body configuration transporting oil and gas in addition to spatially geometric connection effectiveness matching of a fault and a sand body. A fault-sand body configuration can be regarded as being effective, capable of transporting a large quantity of oil and gas, and beneficial for oil-gas accumulation to form a reservoir only if a fault and a sand body can be spatially superimposed on each other and there is sufficient power to charge the oil and gas within the fault into the reservoir; otherwise, it is not beneficial for oil-gas accumulation to form a reservoir.

However, studies on dynamic matching relationship of crude oil fault-sand body transporting oil and gas have not received sufficient attention. In the realistic geological exploration background, especially dense oil and gas in unconventional resources, a high-angle transporting fault may communicate with a plurality of deposited sand bodies. From the perspective of geometric connectivity, fault-sand body matching is effective for transporting oil and gas. However, in an actual situation, even though the physical properties of several sand bodies are close, not all the sand bodies have an oil-gas distribution. Furthermore, a phenomenon "jumping charging" may occur. That is, enrichment of oil and gas is not found in a sand body closer to hydrocarbon source rock, and instead, an oil reservoir is found in a sand body at a greater distance. The above realistic exploration has showed that the research results of geometric matching effectiveness of fault-sand body have important theoretical and practical supports but still cannot fully explain the transport behavior and the final distribution law of oil and gas. There is an urgent need to conduct a fault-sand body matching effectiveness study from the perspective of dynamics.

BRIEF SUMMARY OF THE INVENTION

An objective of the present disclosure is to provide a method for verifying fault-sand body matching by selective crude oil charging based on parallel displacement simulation to solve the problems in the prior art and realize simulation of sandstone bed series of corresponding porosities that can be charged for different fault oil column heights.

To achieve the above objective, the present disclosure provides the following solutions.

The present disclosure provides a method for verifying fault-sand body matching by selective crude oil charging based on parallel displacement simulation, including the following steps:

- S1, selecting a plurality of groups of natural oil-bearing core samples having different porosities, where the core sample of each porosity is formed into two core columns having a same size, and the two core columns are referred to as a first core column and a second core column, respectively, and are parallel samples; and preparing experimental water and oil to simulate actual formation water and crude oil;
- S2, performing oil wash-off, drying, and wetting operations on the second core columns, ensuring that a core wettability of the second core columns is water wettability, and retesting a porosity, a permeability, and an oil saturation of each second core column;
- S3, testing and calculating a simulation condition parameter, testing a charging power and a throat radius corresponding to each first core column by a high pressure mercury injection experiment, and based on a charging power balance, calculating a vertical oil column height h produced by corresponding simulated lateral abutting with a fault;
- S4, mounting the second core columns in different clamping simulation systems of a parallel displacement device, and saturating the second core columns with the prepared experimental water simulating the actual formation water; and
- S5, conducting a crude oil charging saturated formation water core simulation experiment, turning on and off the clamping simulation systems in different orders, and simulating a variety of superimposition relationships of sand bodies spatially laterally abutting against the fault; regulating different charging pressures, simulating a vertical oil column height produced by lateral abutting with the fault, and analyzing a fault-sand body power configuration relationship under the action of a buoyancy based on a difference between crude oil charging behaviors in different simulated situations.

Preferably, in S1, the code samples are divided into three groups, and the three groups of core samples have porosities of 14%, 15%, and 16%, respectively.

Preferably, the first core column and the second core column are cylindrical, and both of the first core column and the second core column have a diameter of 2.5 cm and a length of 5 cm.

Preferably, in S3, the parallel displacement device includes a displacement pump, a data acquisition module, and three clamping simulation systems disposed in parallel; one end of each of the clamping simulation systems is connected with the same displacement pump, and pressure sensors are disposed at two ends of each of the clamping simulation systems; each of the pressure sensors is electrically connected with the data acquisition module; the different second core columns are placed into the clamping simulation systems, respectively; the displacement pump is configured to charge water and oil into the clamping simulation systems; and the clamping simulation systems are independent of one another and capable of being turned on or off independently.

Preferably, the clamping simulation system includes a core holder, a confining pressure system, a nitrogen cylinder, and a glass tube calibration gauge; the core holder is configured to hold the second core column; one end of the core holder is communicated with the displacement pump through a charging pipe on which a charging switching valve is disposed, and the other end of the core holder is connected with a back-pressure valve through a discharge pipe; a discharge switching valve is disposed on the discharge pipe; the back-pressure valve is further connected to the glass tube calibration gauge and is communicated with the nitrogen cylinder through a back-pressure pipe; a back-pressure switching valve is disposed on the back-pressure pipe; the confining pressure system is internally communicated with the core holder; and a confining pressure switching valve is disposed between the confining pressure system and the core holder.

Preferably, in the same clamping simulation system, one of the pressure sensors is located between the charging switching valve and the core holder, and the other one of the pressure sensors is located between the discharge switching valve and the back-pressure valve.

Preferably, the displacement pump is a micro-metering displacement pump.

Preferably, the data acquisition module is a computer acquisition system.

Compared with the prior art, the present disclosure has the following technical effects over the prior art:

1. The present disclosure realizes, by a parallel charging experiment, power requirement analysis on how a sand body is selected for charging crude oil in the fault-sand body power configuration relationship under the action of a buoyancy. A certain clamping simulation system is turned on and off in different orders to simulate a variety of superimposition relationships of sand bodies spatially laterally abutting against the fault. Different charging pressures are regulated and the vertical oil column height that can be produced by lateral abutting with the fault is simulated. Thus, a charging process of crude oil selectively entering into sand bodies can be reproduced visually.
2. The present disclosure is based on the above visually reproduced charging process of crude oil selectively entering into the sand bodies. These sand bodies might not have the best physical properties and might not first abut against a fault. The verification method and result recognition are of great theoretical significance and practical value for an oil-gas distribution law and oil-gas reservoir exploration in actual exploration.
3. The present disclosure has verified the geometric matching effectiveness of fault-sand body and dynamic matching effectiveness of fault-sand body, and can effectively analyze a realistic exploration phenomenon that oil and gas are selectively distributed in part of sand bodies, which is important supplement and perfection for geometric research of fault-sand body.

BRIEF DESCRIPTION OF THE DRAWING

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

Figure 1:
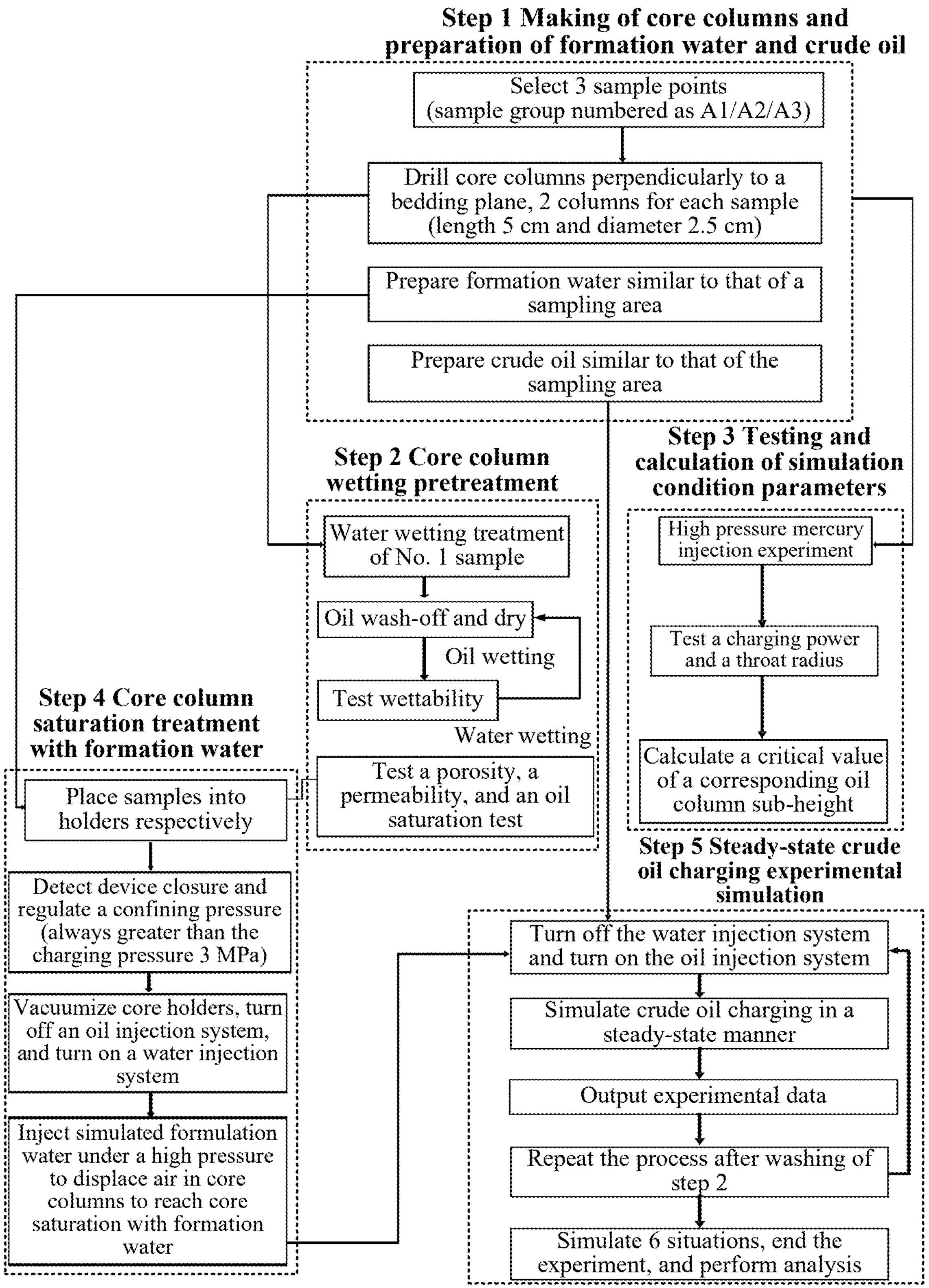
FIG. 1 illustrates a method for verifying fault-sand body matching by selective crude oil charging based on parallel displacement simulation provided in the present disclosure.

List of Reference Numerals: 1—displacement pump, 2—charging switching valve, 3—pressure sensor, 4—core holder, 5—confining pressure system, 6—confining pressure switching valve, 7—discharge switching valve, 8—glass tube calibration gauge, 9—back-pressure valve, 10—nitrogen cylinder, 11—back-pressure switching valve, 12—data acquisition module, 13—first core column, and 14—second core column.

DETAILED DESCRIPTION OF THE INVENTION

The technical solutions of the embodiments of the present disclosure are clearly and completely described below with reference to the accompanying drawings. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

An objective of the present disclosure is to provide a method for verifying fault-sand body matching by selective crude oil charging based on parallel displacement simulation to solve the problems in the prior art and realize simulation of sandstone bed series of corresponding porosities that can be charged for different fault oil column heights.

To make the above objectives, features, and advantages of the present disclosure clearer and more comprehensible, the present disclosure will be further described in detail below with reference to the accompanying drawings and the specific examples.

The present disclosure provides a method for verifying fault-sand body matching by selective crude oil charging based on parallel displacement simulation. A parallel displacement device is used to conduct a parallel displacement experiment. Sample points of different porosities are selected. A water wetting condition is reached by oil wash-off. A plurality of core columns of different porosities are connected in parallel in the parallel displacement device. An experimental charging pressure is regulated to represent that buoyancies corresponding to different oil column heights can be accumulated within a fault, and selectively charged core columns of corresponding porosities are used to simulate sandstone bed series of corresponding porosities that can be charged for different fault oil column heights. Specifically, the following steps are included, as shown in FIG. 1.

S1, core columns are made, and formation water and crude oil are prepared. The specific steps are as follows.

S1a, based on core samples obtained by well drilling in an oil field in a mature exploration area and having basic physical property data (a porosity and an oil saturation), with the porosity as a parameter, oil-bearing sample points are selected, and a fault-sand body power matching relationship under the action of a buoyancy in a conventional reservoir is simulated, where the selected core samples are divided into three groups, and the corresponding porosities of the three groups of core samples are as follows: A1: 16%, A2: 15%, and A3: 14%.

Figure 2:
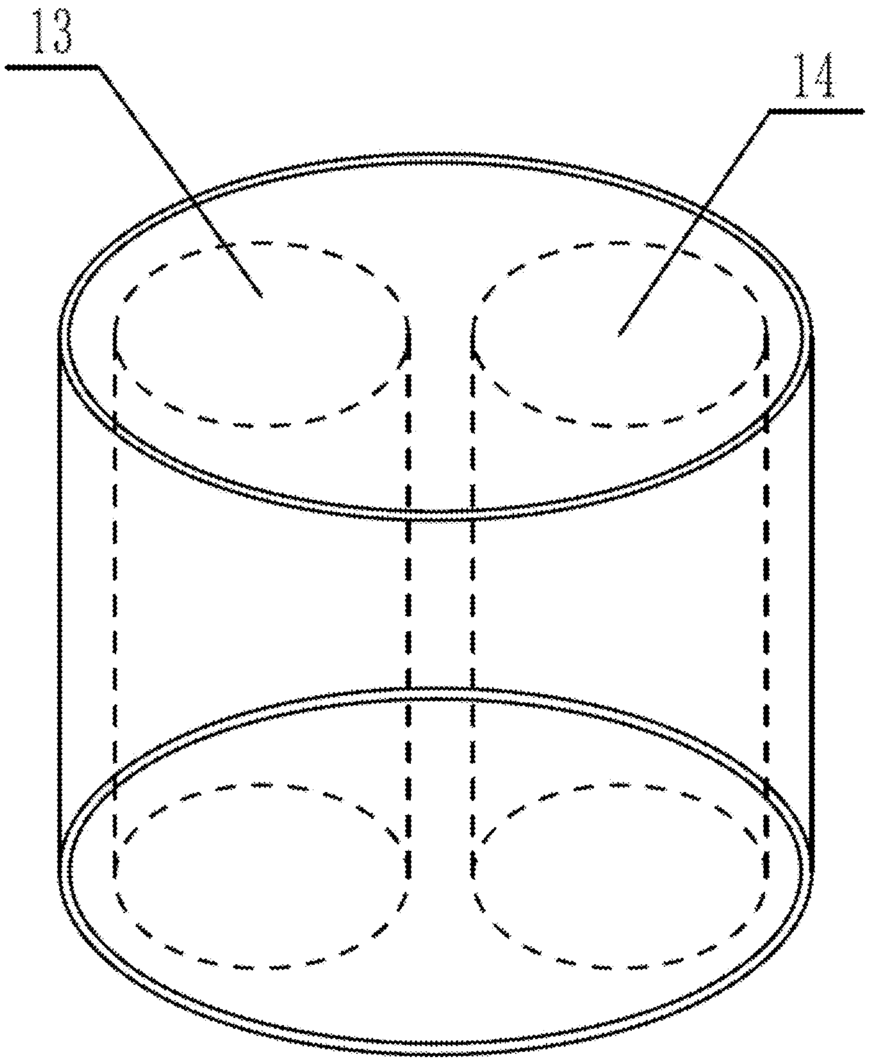
FIG. 2 is a schematic diagram of preparing core columns in S1 of the present disclosure.

S1b, two core columns having a same size are drilled from each sample in a direction perpendicular to a bedding plane or a long axis of the core, as shown in FIG. 2, which are referred to as a first core column 13 and a second core column 14, respectively, and are parallel samples, where the first core column 13 and the second core column 14 are cylindrical, and each core column has a length of 5 cm and a diameter of 2.5 cm.

S1c, the formation water is prepared with reference to a mineralization degree of actual formation water in an oil field, with a water type being $NaHCO_3$ type and a density being 1.02 g/mL, and crude oil is prepared with a viscosity of 44 mPa's and a density of 0.75 g/mL, to simulate actual formation water and crude oil.

S2, wetting pretreatment is performed on the core columns. Specific steps are as follows.

S2a, the second core column 14 in the sample of each porosity is selected and subjected to oil wash-off treatment, and dried, and a porosity, a permeability, and a mass of the dry sample are then detected, where a surfactant may be added in the oil wash-off process; the oil wettability of each second core column 14 is eliminated, and the wettability is tested to ensure that each second core column 14 is only water-wet.

S2b, the porosity, the permeability, and an oil saturation of each second core column 14 are retested.

S3, a charging power and a throat radius corresponding to each sample point are tested, and a vertical oil column height (i.e., an oil column sub-height) that can be produced by corresponding simulated lateral abutting with a fault is calculated. Specific steps are as follows.

S3a, a high pressure mercury injection experiment is conducted on each first core column 13 for analysis to obtain an average pore throat radius r and a starting breakthrough pressure P.

S3b, based on a mechanical equilibrium, an equilibrium condition for crude oil in the fault entering into a sand body is the buoyancy $P_{buoyancy}$ produced by the accumulated oil column height in the fault being equal to the starting breakthrough pressure $P_{mercury\ injection}$ of sandstone, which is obtained by the high pressure mercury injection experiment here.

S3c, a critical oil column height h of crude oil entering into a sand body from the fault for the corresponding sample point is obtained by a buoyancy calculation formula. The buoyancy calculation formula is specifically as follows:

$$P_{buoyancy} = (\rho_{water} - \rho_{oil}) * gh$$

where $g=9.8\ N/m^2$.

TABLE 1

Statistical Table of High Pressure Mercury Injection Test Data and Calculation Data of Core

| Sample Point | Porosity (%) | Charging Power (MPa) | Pore Throat Radius (μm) | Oil Column Height (m) |
|---|---|---|---|---|
| A1 | 16 | 1.51 | 0.15 | 570 |
| A2 | 15 | 1.67 | 0.14 | 630 |
| A3 | 14 | 1.83 | 0.13 | 690 |

The order of S2 and S3 may be adjusted.

S4, the core is saturated with the formation water. Specific steps are as follows.

S4a, the closure of the parallel displacement device is detected, and a confining pressure pump is debugged such that an experimental confining pressure is always higher than a charging pressure by 3 MPa.

S4b, the second core columns 14 are placed into different core holders 4, respectively. Variables may be regarded only as a charging pressure and a porosity.

S4c, the core holders 4 are vacuumized. An oil injection system is turned off, and a water injection system is turned on. Air in the second core columns 14 is displaced by the high pressure water injection system. When no gas is discharged from outlet ends of the core holders 4, it may be regarded as the second core columns 14 being saturated with water.

S5, a fault-sand body power configuration relationship under the action of a buoyancy is simulated and analyzed by a steady-state crude oil charging experiment. Specific steps are as follows.

S5a, the water injection system is turned off, and the oil injection system is turned on. When crude oil charging is observed in the following simulated situations, the simulation may be stopped. The simulated situations are as follows.

Simulated Situation I

Figure 4A:
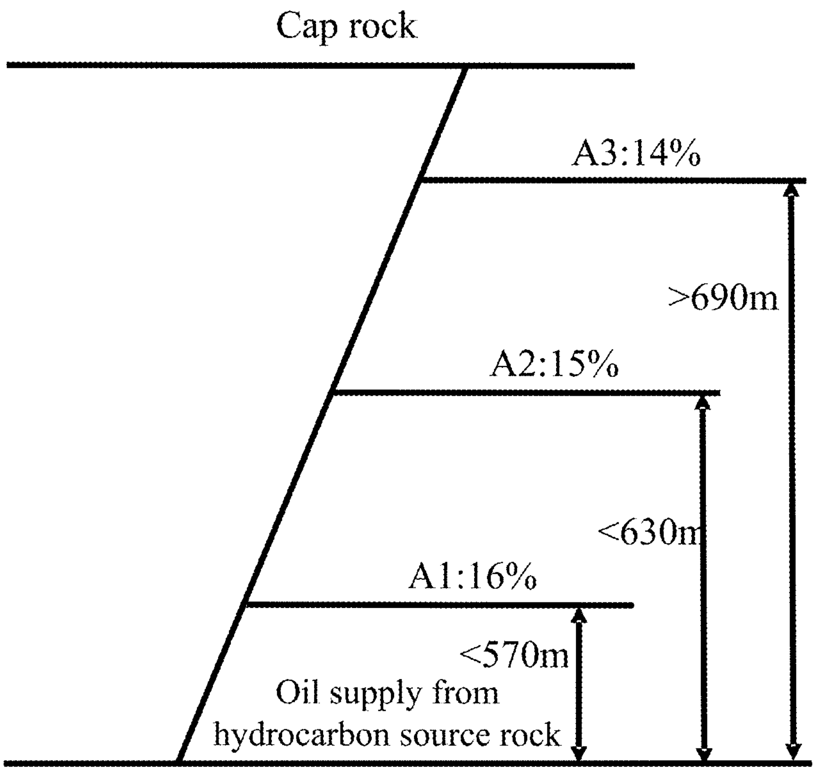
FIGS. 4A-4B are data analysis charts of simulated situation I in the present disclosure.

As shown in FIG. 4A, a transport system of unequally spaced sand bodies superimposed and laterally abutting against the fault in the order from deep to shallow A1-A2-A3 (i.e., the porosities are 16%, 15%, and 14% from deep to shallow) is simulated: (1) clamping simulation systems corresponding to A1, A2, and A3 are turned on; a driving pressure is set to 1.4 MPa; and accumulated charged crude oil quantities of the core holders 4 corresponding to A1, A2, and A3 are observed and recorded (the result is no charging). (2) The clamping simulation system corresponding to A1 is turned off; the driving pressure is increased to 1.6 MPa; and accumulated charged crude oil quantities of the core holders 4 corresponding to A2 and A3 are observed and recorded (the result is no charging). (3) The clamping simulation system corresponding to A2 is turned off; the driving pressure is increased to 1.9 MPa; and an accumulated charged crude oil quantity of the core holder 4 corresponding to A3 is observed and recorded (the result is no charging), and the simulation is stopped.

Analysis of the Simulated Situation I

Figure 4B:
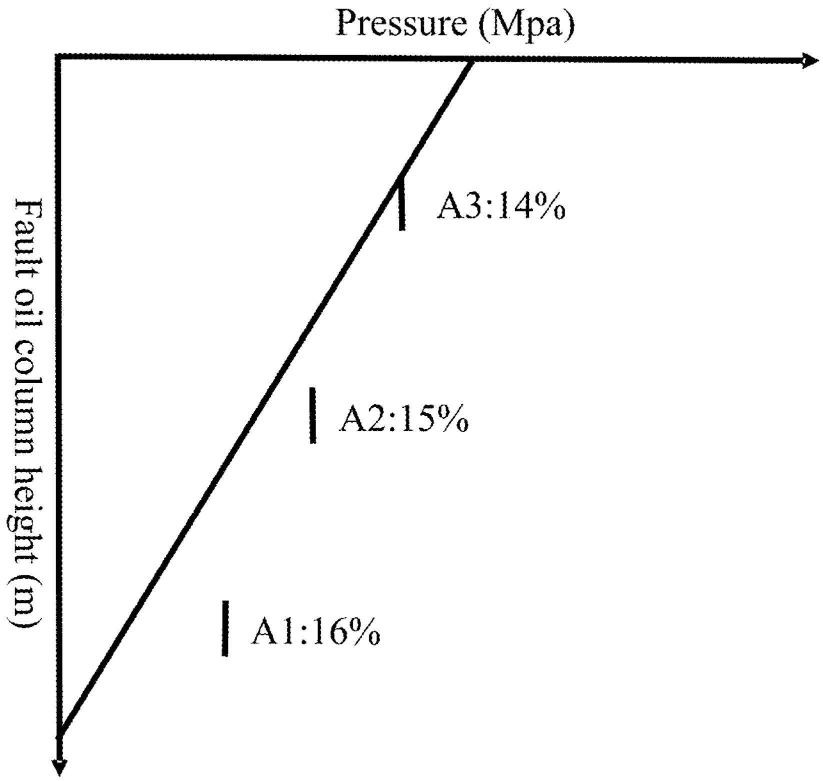

As shown in FIG. 4B, (1) the driving pressure 1.4 MPa corresponds to the oil column height h<570 m of the fault, and operation simulations A1, A2, and A3 do not reach a minimum oil column requirement of charging, and therefore, no crude oil charging phenomenon can be observed. (2) When the clamping simulation system corresponding to A1 is turned off, the driving pressure 1.6 Mpa corresponds to the oil column height 570 m<h<630 m of the fault, and operation simulations A2 and A3 do not reach the minimum oil column requirement of charging, and therefore, no crude oil charging phenomenon can be observed. (3) When the clamping simulation system corresponding to A2 is turned off, the driving pressure 1.9 Mpa corresponds to the oil column height h>690 m of the fault, and operation simulations A2 and A3 do not reach the minimum oil column requirement of charging, and therefore, the crude oil charging phenomenon is observed for A3. The above process shows that: compared with A1 and A2, A3 has a lower porosity. However, since the minimum oil column height requirement h>690 m when fault-sand body abut, crude oil can enter into a sand body having the worst physical property conditions.

Simulated Situation II

Figure 5A:
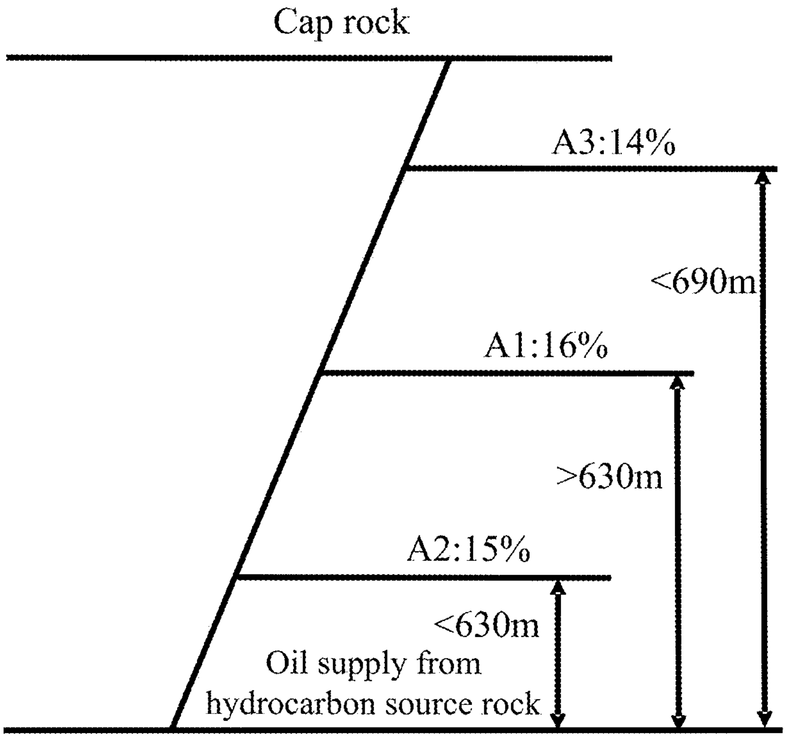
FIGS. 5A-5B are data analysis charts of simulated situation II in the present disclosure.

As shown in FIG. 5A, a transport system of unequally spaced sand bodies superimposed and laterally abutting against the fault in the order from deep to shallow A2-A1-A3 (i.e., the porosities are 15%, 16%, and 14% from deep to shallow) is simulated: (1) the clamping simulation systems corresponding to A2 and A3 are turned on and the clamping simulation system corresponding to A1 is turned off; the driving pressure is set to 1.6 MPa; and accumulated charged crude oil quantities of the core holders 4 corresponding to A2 and A3 are observed and recorded (the result is no charging). (2) The clamping simulation system corresponding to A1 is turned on; the driving pressure is set to 1.6 MPa; and accumulated charged crude oil quantities of the core holders 4 corresponding to A1, A2, and A3 are observed and recorded (the result is charging of the core holder 4 corresponding to A1), and the simulation is stopped.

Analysis of the Simulated Situation II

Figure 5B:
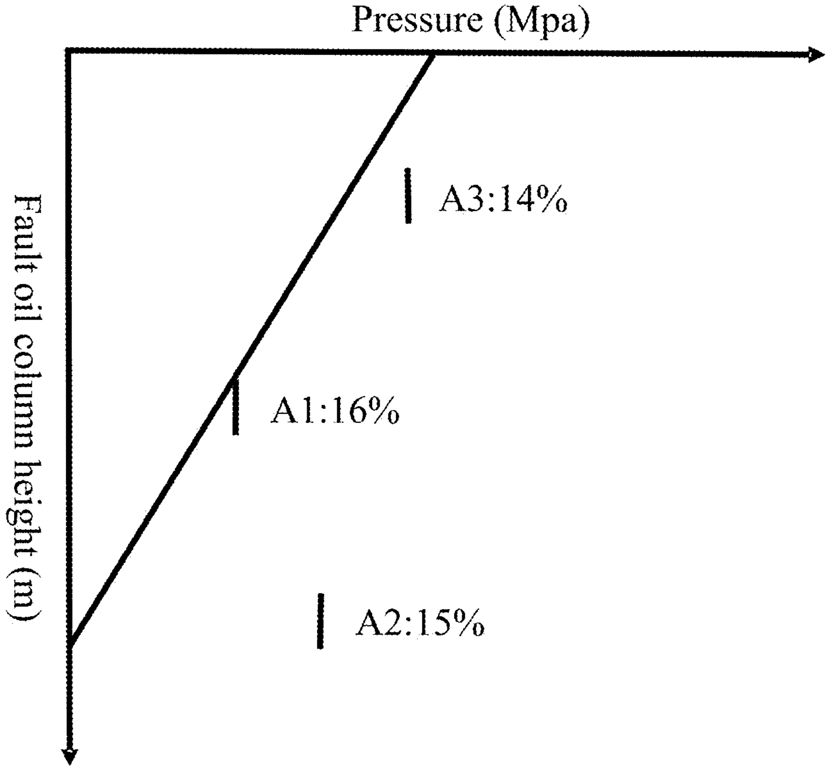

As shown in FIG. 5B, (1) the driving pressure 1.6 MPa corresponds to the oil column height 570 m<h<630 m of the fault, and operation simulations A2 and A3 do not reach the minimum oil column requirement of charging, and therefore, no crude oil charging phenomenon can be observed. Meanwhile, the clamping simulation system corresponding to A1 is turned off; an actual vertical height of abutting against the fault for operation simulation A1 is greater than 630 m; the minimum oil column requirement (570 m) of charging is reached; however, without spatially (570 m<h<630 m) abutting against the fault, no crude oil charging phenomenon can be observed. (2) The clamping simulation system corresponding to A1 is turned on; the driving pressure 1.6 Mpa corresponds to the oil column height 570 m<h<630 m of the fault; among operation simulations A1, A2, and A3, A2 and A3 do not reach the minimum oil column requirement of charging, and therefore, no crude oil charging phenomenon can be observed; and A1 reaches the minimum oil column requirement of charging, and therefore, the crude oil charging phenomenon is observed. The above process shows that: compared with A2, A1 has a greater actual vertical height of abutting against the fault; A2 first abuts against the fault but does not reach the minimum oil column requirement of charging, and therefore, charging cannot be realized. Then, A1 abuts against the fault and reaches the minimum oil column requirement of charging, and crude oil can be charged into A1.

Simulated Situation III

Figure 6A:
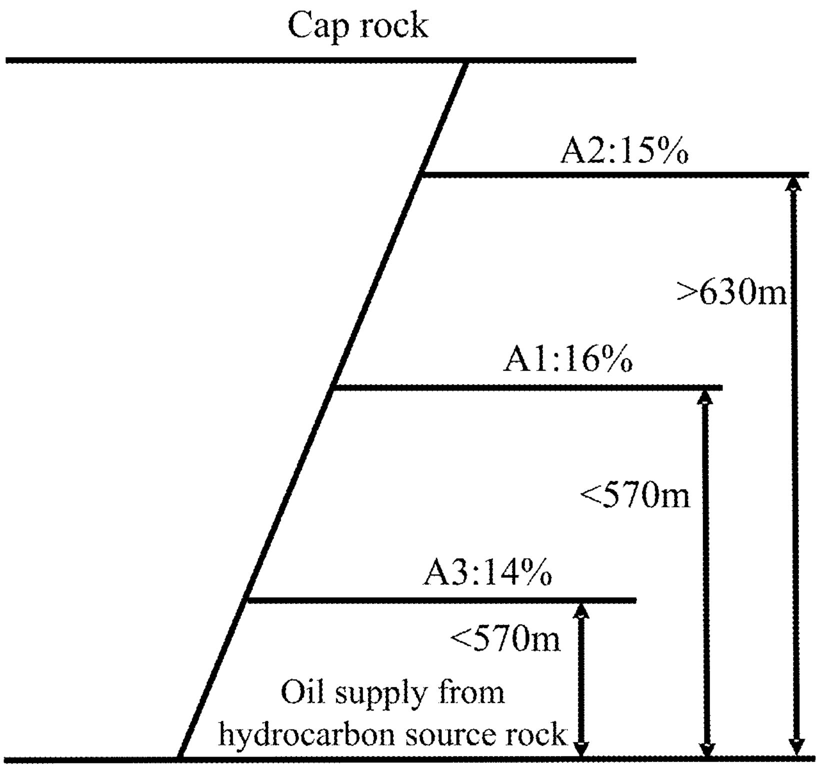
FIGS. 6A-6B are data analysis charts of simulated situation III in the present disclosure.

As shown in FIG. 6A, a transport system of unequally spaced sand bodies superimposed and laterally abutting against the fault in the order from deep to shallow A3-A1-A2 (i.e., the porosities are 14%, 16%, and 15% from deep to shallow) is simulated: (1) the clamping simulation systems corresponding to A1, A2, and A3 are turned on; the driving pressure is set to 1.4 MPa; and accumulated charged crude oil quantities of the core holders 4 corresponding to A1, A2, and A3 are observed and recorded (the result is no charging). (2) The clamping simulation system corresponding to A1 is turned off; the driving pressure is increased to 1.6 MPa; and accumulated charged crude oil quantities of the core holders 4 corresponding to A2 and A3 are observed and recorded (the result is no charging). (3) The driving pressure is increased to 1.8 MPa; accumulated charged crude oil quantities of the core holders 4 corresponding to A2 and A3 are observed and recorded; and crude oil charging occurs for A2, and the simulation is stopped.

Analysis of the Simulated Situation III

Figure 6B:
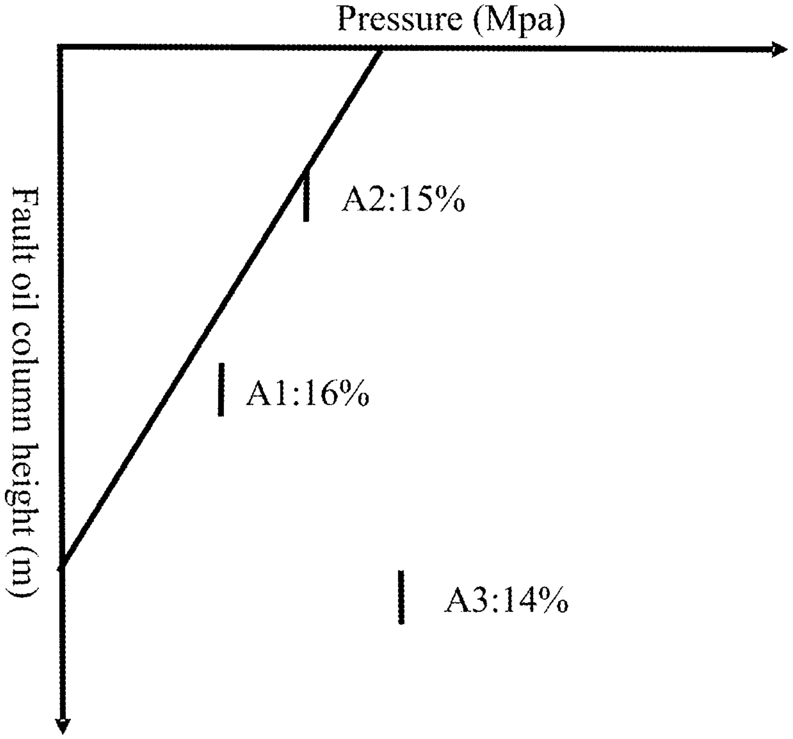

As shown in FIG. 6B, (1) the driving pressure 1.4 MPa corresponds to the oil column height h<570 m of the fault, and operation simulations A1, A2, and A3 do not reach the minimum oil column requirement of charging, and therefore, no crude oil charging phenomenon can be observed. (2) The clamping simulation system corresponding to A1 is turned off, and the situation that the oil column height of A1 is not above 570 m due to a spatial superimposition position is simulated; the driving pressure 1.6 Mpa corresponds to the oil column height 570 m<h<630 m of the fault, and operation simulations A2 and A3 do not reach the minimum oil column requirement of charging, and therefore, no crude oil charging phenomenon can be observed. (3) The driving pressure is increased to 1.8 Mpa which corresponds to the oil column height 630<h<690 m of the fault, and operation simulation A2 reaches the minimum oil column requirement of charging, and therefore, the crude oil charging phenomenon is observed for A2. The above process shows that: compared with A1, A2 has a lower porosity and then abuts against the fault; however, due to a superimposition relationship, A2 may first have a lower oil column height limit of oil-gas charging, and charging is carried out for A2. Compared with A3, A2 has a higher porosity, and A3 first abuts against the fault but does not reach the minimum oil column requirement of charging, and therefore, charging cannot be realized. Then, A2 abuts against the fault and reaches the minimum oil column requirement of charging, and crude oil can be charged into A2.

Simulated Situation IV

Figure 7A:
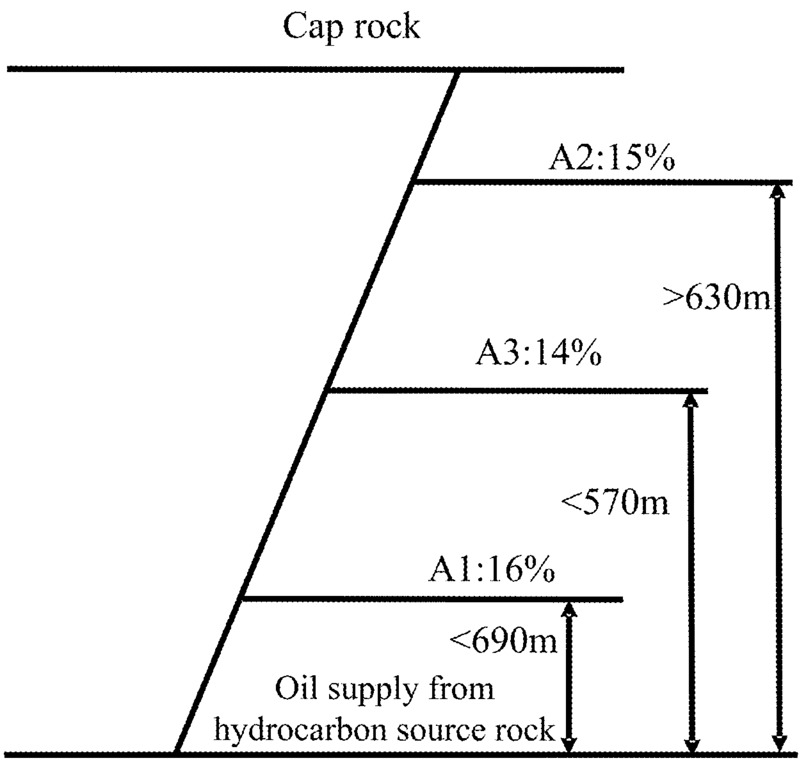
FIGS. 7A-7B are data analysis charts of simulated situation IV in the present disclosure.

As shown in FIG. 7A, a transport system of unequally spaced sand bodies superimposed and laterally abutting against the fault in the order from deep to shallow A1-A3-A2 (i.e., the porosities are 16%, 14%, and 15% from deep to shallow) is simulated: (1) the clamping simulation systems corresponding to A1, A2, and A3 are turned on; the driving pressure is set to 1.4 MPa; and accumulated charged crude oil quantities of the core holders 4 corresponding to A1, A2, and A3 are observed and recorded (the result is no charging). (2) The clamping simulation systems corresponding to A1 and A3 are turned off; the driving pressure is increased to 1.6 MPa; and an accumulated charged crude oil quantity of the core holder 4 corresponding to A2 is observed and recorded (the result is no charging). (3) The driving pressure is increased to 1.8 MPa; an accumulated charged crude oil quantity of the core holder 4 corresponding to A2 is observed and recorded; and crude oil charging occurs for A2, and the simulation is stopped.

Analysis of the Simulated Situation IV

Figure 7B:
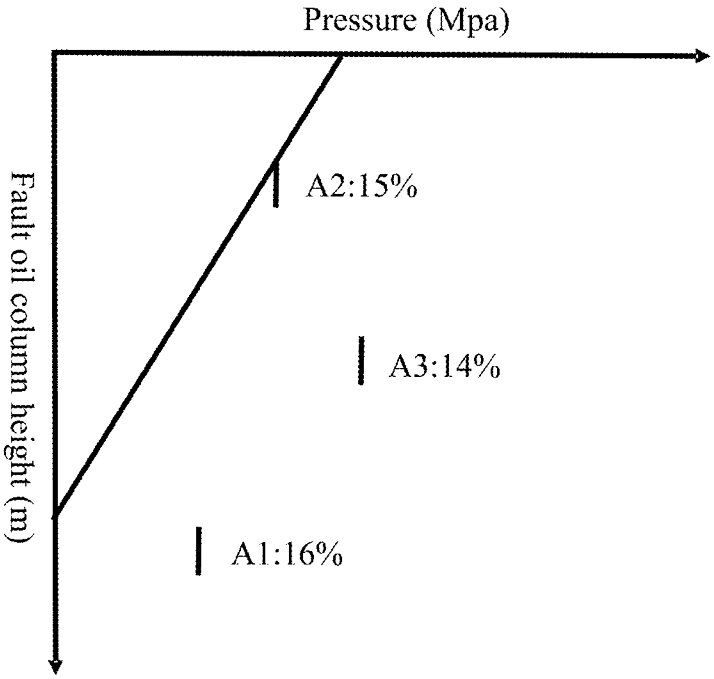

As shown in FIG. 7B, (1) the driving pressure 1.4 MPa corresponds to the oil column height h<570 m of the fault, and operation simulations A1, A2, and A3 do not reach the minimum oil column requirement of charging, and therefore, no crude oil charging phenomenon can be observed. (2) The systems corresponding to A1 and A3 are turned off, and the situation that the oil column heights of A1 and A3 are not above 570 m due to the spatial superimposition position is simulated; the driving pressure 1.6 Mpa corresponds to the oil column height 570 m<h<630 m of the fault, and operation simulation A2 does not reach the minimum oil column requirement of charging, and therefore, no crude oil charging phenomenon can be observed. (3) The driving pressure is increased to 1.8 Mpa which corresponds to the oil column height 630<h<690 m of the fault, and operation simulation A2 reaches the minimum oil column requirement of charging, and therefore, the crude oil charging phenomenon is observed for A2. The above process shows that: compared with A1, A2 has a lower porosity and then abuts against the fault; however, due to a superimposition relationship, A2 may first have a lower oil column height limit of oil-gas charging, and charging is carried out for A2. Compared with A3, A2 has a higher porosity, and A3 first abuts against the fault but does not reach the minimum oil column requirement of charging, and therefore, charging cannot be realized. Then, A2 abuts against the fault and reaches the minimum oil column requirement of charging, and crude oil can be charged into A2.

Simulated Situation V

Figure 8A:
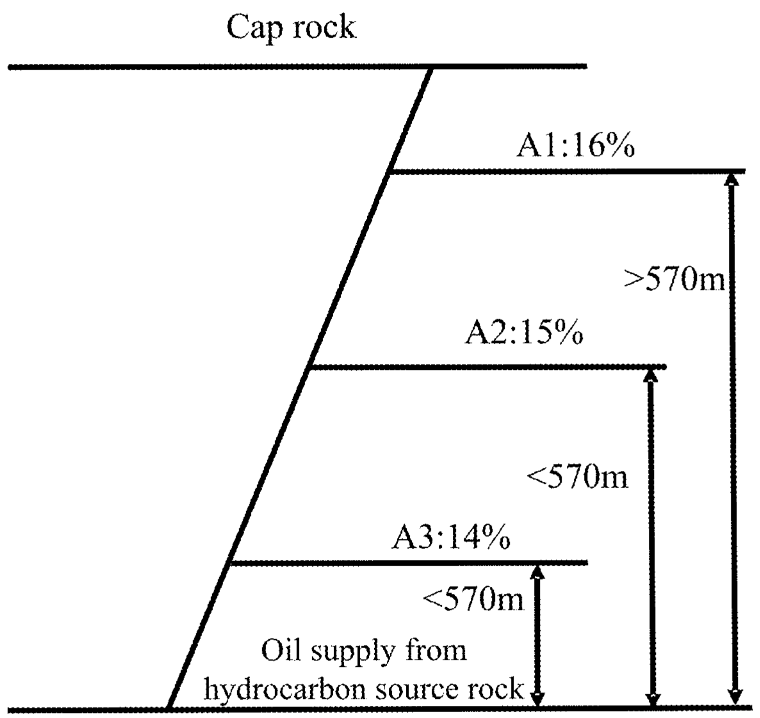
FIGS. 8A-8B are data analysis charts of simulated situation V in the present disclosure.

As shown in FIG. 8A, a transport system of unequally spaced sand bodies superimposed and laterally abutting against the fault in the order from deep to shallow A3-A2-A1 (i.e., the porosities are 14%, 15%, and 16% from deep to shallow) is simulated: (1) the clamping simulation systems corresponding to A1, A2, and A3 are turned on; the driving pressure is set to 1.4 MPa; and accumulated charged crude oil quantities of the core holders 4 corresponding to A1, A2, and A3 are observed and recorded (the result is no charging). (2) The clamping simulation systems corresponding to A1, A2, and A3 are turned on; the driving pressure is set to 1.6 MPa; accumulated charged crude oil quantities of the core holders 4 corresponding to A1, A2, and A3 are observed and recorded; A2 and A3 are not charged, and A1 is charged, and the simulation is stopped.

Analysis of the Simulated Situation V

Figure 8B:
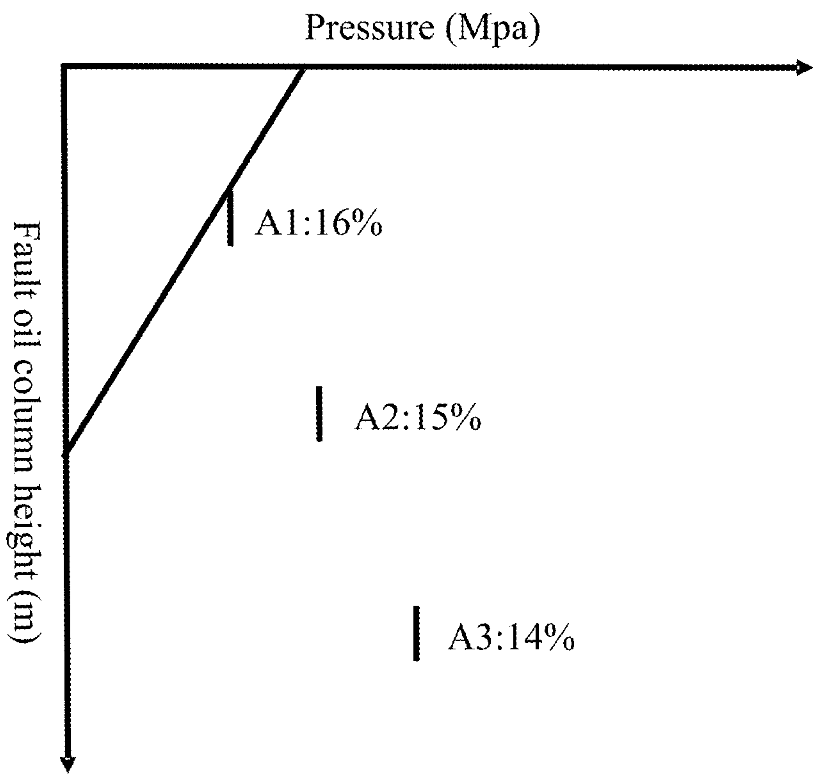

As shown in FIG. 8B, (1) the driving pressure 1.4 MPa corresponds to the oil column height h<570 m of the fault, and operation simulations A1, A2, and A3 do not reach the minimum oil column requirement of charging, and therefore, no crude oil charging phenomenon can be observed. (2) The driving pressure 1.6 Mpa corresponds to the oil column height 570 m<h<630 m of the fault, and operation simulations A2 and A3 do not reach the minimum oil column requirement of charging, and therefore, no crude oil charging phenomenon can be observed; and operation simulation A1 reaches the minimum oil column requirement of charging, and therefore, the crude oil charging phenomenon is observed for A1. The above process shows that: although A2 and A3 spatially abut against the fault first, A1 has the highest porosity and the minimum accumulated oil column height for the fault, and since the A3-A2-A1 superimposition relationship determines that h is the maximum when A1 spatially abuts against the fault, in the sand body superimposition relationship, A1 is charged most easily.

Simulated Situation VI

Figure 9A:
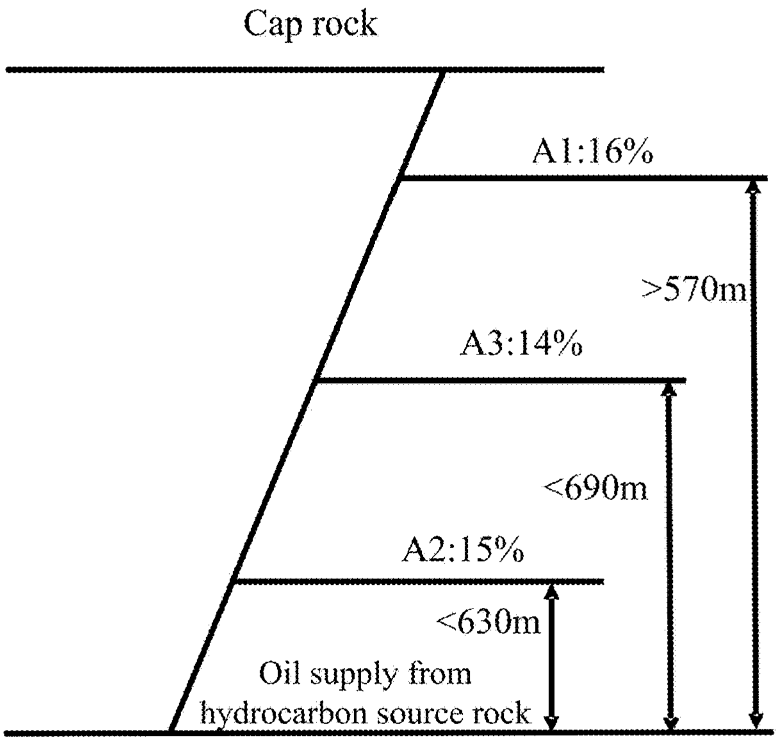
FIGS. 9A-9B are data analysis charts of simulated situation VI in the present disclosure.

As shown in FIG. 9A, a transport system of unequally spaced sand bodies superimposed and laterally abutting against the fault in the order from deep to shallow A2-A3-A1 (i.e., the porosities are 15%, 14%, and 16% from deep to shallow) is simulated: (1) the clamping simulation systems corresponding to A1, A2, and A3 are turned on; the driving pressure is set to 1.4 MPa; and accumulated charged crude oil quantities of the core holders 4 corresponding to A1, A2, and A3 are observed and recorded (the result is no charging). (2) The clamping simulation systems corresponding to A1, A2, and A3 are maintained in an on state; the driving pressure is set to 1.6 MPa; accumulated charged crude oil quantities of the core holders 4 corresponding to A1, A2, and A3 are observed and recorded; A2 and A3 are not charged, and A1 is charged, and the simulation is stopped.

Analysis of the Simulated Situation VI

Figure 9B:
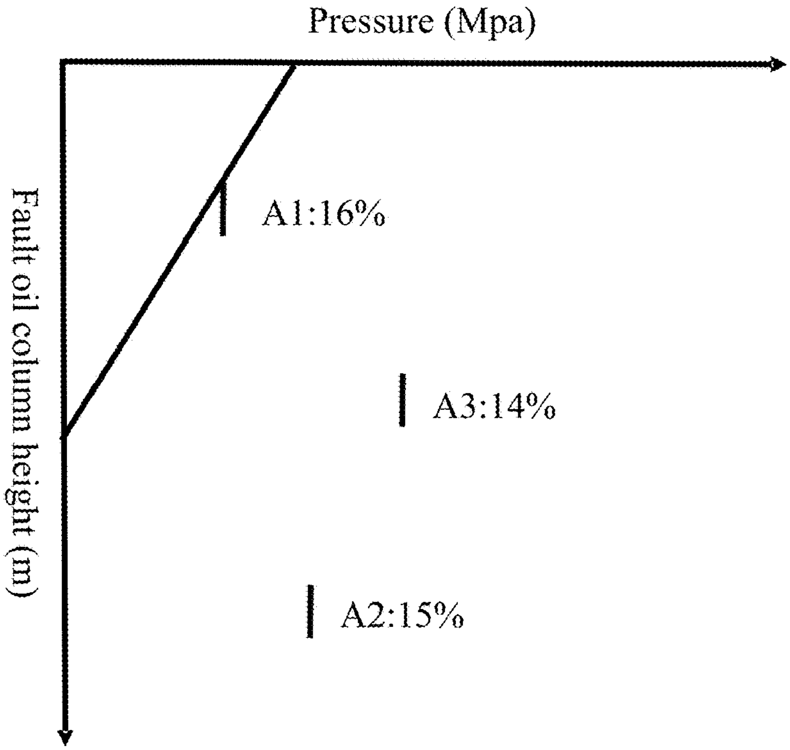

As shown in FIG. 9B, (1) the driving pressure 1.4 MPa corresponds to the oil column height h<570 m of the fault, and operation simulations A1, A2, and A3 do not reach a minimum oil column requirement of charging, and therefore, no crude oil charging phenomenon can be observed. (2) The driving pressure 1.6 Mpa corresponds to the oil column height 570 m<h<630 m of the fault, and operation simulations A2 and A3 do not reach the minimum oil column requirement of charging, and therefore, no crude oil charging phenomenon can be observed; and operation simulation A1 reaches the minimum oil column requirement of charging, and therefore, the crude oil charging phenomenon is observed for A1. The above process shows that: although A2 and A3 spatially abut against the fault first, A1 has the highest porosity and the minimum accumulated oil column height for the fault, and since the A3-A2-A1 superimposition relationship determines that h is the maximum when A1 spatially abuts against the fault, in the sand body superimposition relationship, A1 is charged most easily.

The simulated situation V have the same steps and consistent analysis results with the simulated situation VI, indicating that for a sand body having the best physical properties and the shallowest superimposed position for A1, regardless of the configuration relationships of the other two sand bodies, A1 can be charged first as long as the accumulated oil column height is within the range 570 m<h<630 m.

Moreover, core column wetting pretreatment and core saturation treatment with formation water are performed as a "return-to-zero state" at the start of the experiment before and after each simulated situation.

In the above simulated situations, different charging pressures are regulated. According to the formula $P_{buoyancy}=(\rho_{water}-\rho_{oil})gh$, the buoyancy is equal to the charging pressure. That is, the charging pressure is calculated from the oil column height h. The charging pressure is a critical power condition for crude oil entering into a sand body from the fault. On this basis, the purpose of obtaining the oil column height h is to select a charging power in charging simulation so that different charging phenomena can occur. Thus, a specific critical condition of the charging experiment is applied with this value.

In the embodiments, the above simulated situations I to V involve experimental rounds in the context of different spatial combinations of sand bodies having three particular porosity values, and the fault. Meanwhile, the setting of the oil column height (the charging pressure) also tends to a concentrated typical charging process, which is not exhaustive. If the simulated charging pressure is initially set to be capable of breaking through all sand layers, the sand body first spatially abutting against the fault (regardless of the superimposition relationship) may have the charging behavior. In addition, oil and gas have differences in density and charging power, but are similar in principles.

Figure 3:
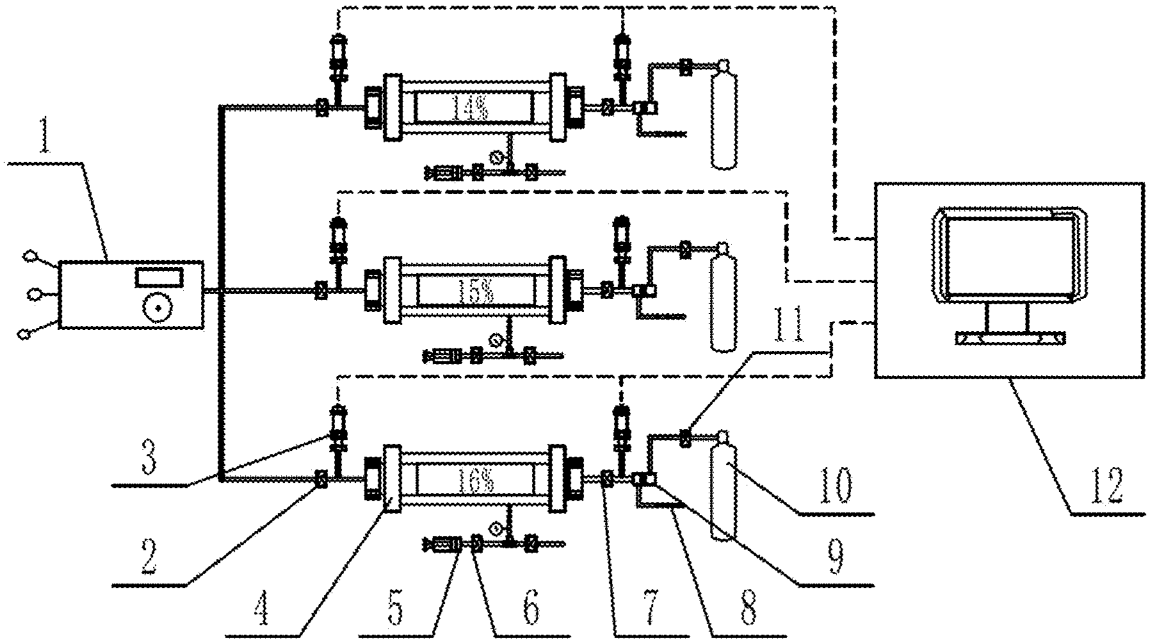
FIG. 3 is a structural schematic diagram of a parallel displacement device in the present disclosure.

Specifically, in S3, as shown in FIG. 3, the parallel displacement device includes a displacement pump 1, a data acquisition module 12, and three clamping simulation systems disposed in parallel. One end of each clamping simulation system is connected with the same displacement pump 1, and pressure sensors 3 are disposed at two ends of each clamping simulation system. Each pressure sensor 3 is electrically connected with the data acquisition module 12. The different second core columns 14 having different porosities are placed into the clamping simulation systems, respectively. The clamping simulation systems disposed in parallel have advantages that can be visually compared. The displacement pump 1 is configured to charge water and oil into the clamping simulation systems. The clamping simulation systems are independent of one another and can be turned on or off independently.

The clamping simulation system includes a core holder 4, a confining pressure system 5, a nitrogen cylinder 10, and a glass tube calibration gauge 8. The core holder 4 is configured to hold the second core column 14. One end of the core holder 4 is communicated with the displacement pump 1 through a charging pipe, and a charging switching valve 2 is disposed on the charging pipe and can charge water or charge oil into the second core column 14 or stop charging. The other end of the core holder 4 is connected with a back-pressure valve 9 through a discharge pipe. A discharge switching valve 7 is disposed on the discharge pipe. The back-pressure valve 9 is further connected to the glass tube calibration gauge 8. The glass tube calibration gauge 8 is placed at the outlet end of the second core column 14, and is capable of metering a volume of water displaced by charged crude oil and capable of metering a superfluous charged oil quantity after the second core column 14 is saturated with oil. A difference between the superfluous charged oil quantity and an injected quantity is a quantity of saturated crude oil charged into the second core column 14. The back-pressure valve 9 is communicated with the nitrogen cylinder 10 through a back-pressure pipe. The back-pressure valve 9 is configured to a pressure and a flow rate of a fluid passing therethrough. A back-pressure switching valve 11 is disposed on the back-pressure pipe. The confining pressure system 5 is internally communicated with the core holder 4, and a confining pressure switching valve 6 is disposed between the confining pressure system 5 and the core holder 4. The switching valves are provided such that the gas tightness of the entire device can be inspected before the experiment starts, and water charging, oil charging, confining pressure applying control, and the like can be performed as required during the experiment.

In the same clamping simulation system, one pressure sensor 3 is located between the charging switching valve 2 and the core holder 4, and the other pressure sensor 3 is located between the discharge switching valve 7 and the back-pressure valve 9. With the pressure sensors 3, pressures at the inlet ends and the outlet ends of the core holders 4 can be monitored in real time. The displacement pump 1 is a micro-metering displacement pump.

The data acquisition module 12 is a computer acquisition system.

Specific examples are used for illustration of the principles and implementations of the present disclosure. The description of the above embodiments is merely used to help understand the method of the present disclosure and its core ideas. In addition, those of ordinary skill in the art can make modifications in terms of specific implementations and scope of use according to the ideas of the present disclosure. In conclusion, the content of the present specification should not be construed as a limitation to the present disclosure.

What is claimed is:

1. A method for verifying fault-sand body matching by selective crude oil charging based on parallel displacement simulation, comprising the following steps:

S1, selecting a plurality of groups of natural oil-bearing core samples having different porosities, wherein the core sample of each porosity is formed into two core columns having a same size, and the two core columns are referred to as a first core column and a second core column, respectively, and are parallel samples; and preparing experimental water and oil to simulate actual formation water and crude oil;

S2, performing oil wash-off, drying, and wetting operations on the second core columns, ensuring that a core wettability of the second core columns is water wettability, and retesting a porosity, a permeability, and an oil saturation of each second core column;

S3, testing and calculating a simulation condition parameter, testing a charging power and a throat radius corresponding to each first core column by a high pressure mercury injection experiment, and based on a charging power balance, calculating a vertical oil column height h produced by corresponding simulated lateral abutting with a fault;

S4, mounting the second core columns in different clamping simulation systems of a parallel displacement device, and saturating the second core columns with the prepared experimental water simulating the actual formation water; and S5, conducting a crude oil charging saturated formation water core simulation experiment, turning on and off the clamping simulation systems in different orders, and simulating a variety of superimposition relationships of sand bodies spatially laterally abutting against the fault; regulating different charging pressures, simulating a vertical oil column height produced by lateral abutting with the fault, and analyzing a fault-sand body power configuration relationship under the action of a buoyancy based on a difference between crude oil charging behaviors in different simulated situations.

2. The method for verifying fault-sand body matching by selective crude oil charging based on parallel displacement simulation according to claim 1, wherein in S1, the core samples are divided into three groups, and the three groups of core samples have porosities of 14%, 15%, and 16%, respectively.

3. The method for verifying fault-sand body matching by selective crude oil charging based on parallel displacement simulation according to claim 1, wherein the first core column and the second core column are cylindrical, and both of the first core column and the second core column have a diameter of 2.5 cm and a length of 5 cm.

4. The method for verifying fault-sand body matching by selective crude oil charging based on parallel displacement simulation according to claim 1, wherein in S3, the parallel displacement device comprises a displacement pump, a data acquisition module, and three clamping simulation systems disposed in parallel; one end of each of the clamping simulation systems is connected with the same displacement pump, and pressure sensors are disposed at two ends of each of the clamping simulation systems; each of the pressure sensors is electrically connected with the data acquisition module; the different second core columns are placed into the clamping simulation systems, respectively; the displacement pump is configured to charge water and oil into the clamping simulation systems; and the clamping simulation systems are independent of one another and capable of being turned on or off independently.

5. The method for verifying fault-sand body matching by selective crude oil charging based on parallel displacement simulation according to claim 4, wherein the clamping simulation system comprises a core holder, a confining pressure system, a nitrogen cylinder, and a glass tube calibration gauge; the core holder is configured to hold the second core column; one end of the core holder is communicated with the displacement pump through a charging pipe on which a charging switching valve is disposed, and the other end of the core holder is connected with a back-pressure valve through a discharge pipe; a discharge switching valve is disposed on the discharge pipe; the back-pressure valve is further connected to the glass tube calibration gauge and is communicated with the nitrogen cylinder through a back-pressure pipe; a back-pressure switching valve is disposed on the back-pressure pipe; the confining pressure system is internally communicated with the core holder; and a confining pressure switching valve is disposed between the confining pressure system and the core holder.

6. The method for verifying fault-sand body matching by selective crude oil charging based on parallel displacement simulation according to claim 5, wherein in the same clamping simulation system, one of the pressure sensors is located between the charging switching valve and the core holder, and the other one of the pressure sensors is located between the discharge switching valve and the back-pressure valve.

7. The method for verifying fault-sand body matching by selective crude oil charging based on parallel displacement simulation according to claim 4, wherein the displacement pump is a micro-metering displacement pump.

8. The method for verifying fault-sand body matching by selective crude oil charging based on parallel displacement simulation according to claim 4, wherein the data acquisition module is a computer acquisition system.

* * * * *